United States Patent
Hu et al.

(10) Patent No.: US 10,317,548 B2
(45) Date of Patent: Jun. 11, 2019

(54) REFLECTION SEISMIC DATA Q TOMOGRAPHY

(71) Applicants: Wenyi Hu, Katy, TX (US); Lorie K. Bear, Shenandoah, TX (US); Hongchuan Sun, Spring, TX (US); Carey M. Marcinkovich, The Woodlands, TX (US)

(72) Inventors: Wenyi Hu, Katy, TX (US); Lorie K. Bear, Shenandoah, TX (US); Hongchuan Sun, Spring, TX (US); Carey M. Marcinkovich, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 461 days.

(21) Appl. No.: 14/437,158

(22) PCT Filed: Aug. 30, 2013

(86) PCT No.: PCT/US2013/057628
§ 371 (c)(1),
(2) Date: Apr. 20, 2015

(87) PCT Pub. No.: WO2014/084945
PCT Pub. Date: Jun. 5, 2014

(65) Prior Publication Data
US 2015/0253444 A1    Sep. 10, 2015

Related U.S. Application Data

(60) Provisional application No. 61/730,803, filed on Nov. 28, 2012.

(51) Int. Cl.
*G01V 1/28* (2006.01)
*G01V 1/30* (2006.01)

(52) U.S. Cl.
CPC .............. *G01V 1/307* (2013.01); *G01V 1/282* (2013.01); *G01V 1/301* (2013.01); *G01V 1/306* (2013.01);
(Continued)

(58) Field of Classification Search
CPC ....................................................... G01V 1/307
See application file for complete search history.

(56) References Cited

U.S. PATENT DOCUMENTS

| 3,812,457 A | 5/1974 | Weller |
| 3,864,667 A | 2/1975 | Bahjat |

(Continued)

FOREIGN PATENT DOCUMENTS

| CA | 2 796 631 | 11/2011 |
| EP | 1 094 338 | 4/2001 |

(Continued)

OTHER PUBLICATIONS

Cavalca, M et al. (2011) "Ray-based Tomography for Q Estimation and Q Compensation in Complex Media", 73$^{rd}$ *EAGE Conference & Exhibition incorporating SPE* Europec Vienna, Austria, May 23-26, 2011, pp. 1-5.

(Continued)

*Primary Examiner* — Manuel L Barbee
*Assistant Examiner* — Raymond L Nimox
(74) *Attorney, Agent, or Firm* — ExxonMobil Upstream Research Company—Law Department

(57) ABSTRACT

Method for reconstructing subsurface Q depth profiles from common offset gathers (92) of reflection seismic data by performing migration (40), ray tracing (100), CDP-to-surface takeoff angle finding (96, 98), kernel matrix construction (110), depth-to-time conversion and wavelet stretching (Continued)

correction (80), source amplitude spectrum fitting, centroid frequency shift calculation (90), and box-constrained optimization (120).

8 Claims, 10 Drawing Sheets

(52) U.S. Cl.
CPC .. *G01V 2210/512* (2013.01); *G01V 2210/614* (2013.01); *G01V 2210/671* (2013.01)

(56) References Cited

U.S. PATENT DOCUMENTS

| | | | |
|---|---|---|---|
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,002,642 A | 12/1999 | Krebs |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,138,076 A | 10/2000 | Graf et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,864,890 B2 | 3/2005 | Meek et al. |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,243,029 B2 | 7/2007 | Lichman et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,517 B2 | 5/2008 | Rickett |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,442,770 B2 | 5/2013 | Bruun et al. |
| 8,547,794 B2 | 10/2013 | Gulati et al. |
| 8,688,381 B2 | 4/2014 | Routh et al. |
| 8,781,748 B2 | 7/2014 | Laddoch et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0041815 A1* | 3/2004 | Meek ............... G01V 1/303 345/582 |

(56) References Cited

U.S. PATENT DOCUMENTS

| | | |
|---|---|---|
| 2004/0199330 A1 | 10/2004 | Routh et al. |
| 2004/0225438 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0052280 A1* | 2/2009 | Herrmann .......... G01V 1/28 367/53 |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0257308 A1* | 10/2009 | Bevc .......... G01V 1/303 367/53 |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2010/0332139 A1* | 12/2010 | Bruun .......... G01V 1/282 702/18 |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0075516 A1* | 3/2011 | Xia .......... G01V 1/303 367/53 |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0273961 A1* | 11/2011 | Hu .......... G01V 1/282 367/47 |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010820 A1* | 1/2012 | Winbow .......... G01V 1/303 702/18 |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0075954 A1* | 3/2012 | Xu .......... G01V 1/303 367/38 |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0218861 A1* | 8/2012 | Xia .......... G01V 1/303 367/73 |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0060539 A1 | 3/2013 | Baumstein |
| 2013/0081752 A1 | 4/2013 | Kurimura et al. |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0350861 A1 | 11/2014 | Wang et al. |
| 2014/0358504 A1 | 12/2014 | Baumstein et al. |
| 2014/0372043 A1 | 12/2014 | Hu et al. |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Xin, K. et al. (2009) "3-D tomographic amplitude inversion for compensating amplitude attenuation in the overburden", *SEG Technical Program Expanded Abstracts*, pp. 3239-3243.

Xin, K. et al. (2009) "3-D tomographic Q inversion for compensating frequency dependent attenuation and dispersion" *SEG Technical Program Expanded Abstracts*, pp. 4014-4018.

U.S. Appl. No. 14/329,431, filed Jul. 11, 2014, Krohn et al.

U.S. Appl. No. 14/330,767, filed Jul. 14, 2014, Tang et al.

He, Y. et al. (2012), "Q tomography towards true amplitude imaging and improved sub-karst imaging," 2012 SEG Annual Meeting, 2 pgs.

Hu, W. et al. (2011), "A robust and accurate seismic attenuation tomography algorithm," 2011 SEG San Antonio Annual Meeting, pp. 2727-2731.

Hung, B. et al. (2008), "3-D Tomographic Amplitude Inversion for Compensating Transmission Losses in the Overburden," 70th EAGE Conf. & Exh., Rome, Italy, 5 pgs.

Liao, Q. et al. (1996), "Multifrequency viscoacoustic modeling and inversion," *Geophysics* 61(5), pp. 1371-1378.

Marfurt, J.J. (2006), "Robust estimates of 3D reflector dip and azimuth," *Geophysics* 71(4), pp. P29-P40.

Morigi, S. et al. (2007), "An iterative method for linear discrete ill-posed problems with box constraints," *Journal of Computational and Applied Mathematics* 198, pp. 505-520.

Pratt, R.G. et al. (2003), "Crosshole waveform tomography velocity and attenuation images of arctic gas hydrates," SEG Expanded Abstracts, pp. 2255-2258.

(56) References Cited

OTHER PUBLICATIONS

Quan, Y. et al. (1997), "Seismic attenuation tomography using the frequency shift method," *Geophysics* 62(3), pp. 895-905.
Rossi, G. et al. (2007), "Attenuation tomography: An application to gas-hydrate and free-gas detection," *Geophysical Prospecting* 55, pp. 655-669.
Vinje, V. et al. (1993), "Traveltime and amplitude estimation using wavefront construction," *Geophysics* 58(8), pp. 1157-1166.
Zhang, C. (2001), "Seismic Absorption Estimation and Compensation," Thesis, The University of British Columbia, 109 pgs.
Raypath, U., (2013), "Wavefront Curvature, Normal Moveout Velocity (VNMO) and Subsurface Medium Properties", Seismic Reflection Processing: with Special Reference to Anisotropy, pp. 207-240.
Julian, B.R., et al., (1977), "Three-Dimensional Seismic Ray Tracing", Journal of Geophysics, vol. 43, pp. 95-113.
Liu, Q., et al., (2012), "Seismic Imaging: From Classical to Adjoint Tomography", Tectonophysics, vol. 566-567, pp. 31-66.

* cited by examiner

REFLECTION SEISMIC DATA Q TOMOGRAPHY

CROSS-REFERENCE TO RELATED APPLICATION

This application is the National Stage entry under 35 U.S.C. 371 of PCT/US2013/057628 that published as WO 2014/084945 and was filed on 30 Aug. 2013, which claims the benefit of U.S. Provisional Application No. 61/730,803, filed Nov. 28, 2012, the entirety of which is incorporated by reference herein.

FIELD OF THE INVENTION

The invention relates generally to the field of geophysical prospecting and, more particularly, to seismic data processing. Specifically, the invention relates to the technical field of Q tomography using recorded reflection seismic data.

BACKGROUND OF THE INVENTION

Seismic attenuation can be quantitatively parameterized by the quality factor Q, a parameter assumed to be constant over the frequency range used in geophysical applications. Accurate estimation of Q distribution and Q values is critical for geophysical exploration and production, such as rock property characterization, reservoir development, and attenuation compensation in earth imaging.

Q tomography is an advanced approach for automatic estimation of subsurface Q anomaly geometries and the associated Q values for 2D or 3D scenarios. This approach analyzes the attributes of the recorded seismic data to reconstruct the Q profile. Generally, Q tomography algorithms are classified into two main categories. One category is ray-based tomography (Quan and Harris, 1997; Rossi et al., 2007). The other category is wave-equation-based tomography (Liao and McMechan, 1996; Pratt et al., 2003). Wave-equation-based tomography is physically more accurate but computationally expensive and not practical for 3D cases. The present invention belongs to the category of ray-based Q tomography.

Ray-based Q tomography is essentially a linear optimization problem. Three main components of ray-based Q tomography algorithms are: 1) construction of a kernel matrix by using the raypath information obtained through ray tracing procedure; 2) construction of a measurement vector by using one or several attributes of the recorded seismic traces because these traces carry a great amount of information of the subsurface Q distribution; 3) solving the linear optimization problem formulated by relating the kernel matrix, the Q distribution profile, and the measurement vector. Most existing ray-based Q tomography algorithms use transmission seismic data to reconstruct subsurface Q models (Quan and Harris, 1997; Hu et al., 2011). This type of Q tomography algorithms are referred to as refraction seismic data Q tomography or transmission seismic data Q tomography. The procedure of transmission seismic data Q tomography is relatively simple because pre-migration prestack seismic data (i.e., time domain data) are used (Hu et al., 2011). Consequently, the construction of the kernel matrix for transmission seismic data Q tomography is straightforward. First, with the given seismic survey geometry and the given velocity model, shot-to-receiver ray tracing is implemented. Then, the number of seismic rays penetrating each subsurface grid is populated and the lengths of these rays in each grid are measured. Collecting the raypath information, one can build a kernel matrix. Combining the kernel matrix and the measurement vector, eventually one can formulate an optimization problem to reconstruct the subsurface Q model.

Unfortunately, transmission seismic data are not always available. In many exploration geophysical applications, the number of transmission seismic traces is very limited, which implies that the formulated transmission seismic Q tomographic inverse problem can be very underdetermined. Furthermore, with limited range of offsets, transmission seismic rays do not travel down into deep regions. In other words, these rays only carry the shallow region geophysical property information. Therefore, the transmission seismic data cannot be used to reconstruct deep Q models. FIGS. 1A-1B give an example of transmission seismic ray coverage and its relationship to the Q models at different depths. FIG. 1A shows the velocity model and the corresponding transmission seismic raypaths. In FIG. 1B, there are two Q anomalies. One of them is located in the shallow region, while the other is buried in the deep region. The shallow Q anomaly is fully covered by the transmission seismic raypaths. Therefore, this Q anomaly can be reconstructed by using transmission seismic data Q tomography. However, the other Q anomaly is too deep to be recovered by using transmission seismic data only. On the other hand, reflection seismic rays do penetrate this deep Q anomaly, as shown in FIG. 1B. Therefore, to estimate the deep region Q distribution profile, reflection seismic data have to be utilized. This invention is a method for using reflection seismic data in Q tomography to reconstruct a subsurface Q model reliably, especially for deep regions.

In transmission seismic data Q tomography algorithms, source-to-receiver ray tracing is performed and then the raypath information in each model grid is obtained to build the kernel matrix for Q tomography. The reason that this procedure can be performed in transmission seismic data Q tomography is that the raypaths are relatively simple for transmission seismic data, as shown in FIG. 2. It is straightforward to measure ray lengths $l_{ij}$ in each grid to build the kernel matrix; for example $l_{13}$, $l_{14}$, $l_{24}$, $l_{25}$, $l_{26}$, $l_{36}$, $l_{37}$ ... in FIG. 2. In reflection seismic data Q tomography, usually the kernel matrix cannot be constructed by directly measuring the seismic raypath for each pre-migration seismic trace due to the following reasons: 1) there are too many reflection seismic traces; 2) reflection seismic raypaths are too complicated and it is extremely difficult to trace all the shot-to-receiver seismic rays; 3) there are many multiple arrivals which makes it impossible to separate the contributions from different seismic raypaths; 4) it is very difficult to pick the right events in the pre-migration reflection seismic traces for a specific raypath. For example, in FIG. 3, where the velocity is constant and only two reflectors are in presence, for the shot-receiver pair shown in FIG. 3, there are at least four different raypaths labeled as Ray 1 to Ray 4. For more realistic scenarios, the raypaths are even more complicated. Under some circumstances, if the geological structures are simple, it might be possible that pre-migration reflection seismic data can be analyzed and used for Q tomography (Rossi et al., 2007). However, in most cases, reflection seismic data Q tomography algorithms only work on post-migration seismic data (i.e., image domain data or depth domain data) instead of pre-migration seismic data (i.e., time domain data).

In most existing reflection seismic data Q tomography algorithms (Hung et al., 2008), the relationship between the post-migration seismic data and the subsurface Q distribution profile is established through spectral ratio method, which is a widely used approach utilizing the amplitude decay information to derive Q values. However, the amplitude decay based method for Q estimation is significantly affected by reflection and transmission loss and an illumination imbalance issue. Another method to link the seismic data and the Q profile is the so-called centroid frequency shift method (Quan and Harris, 1997), which is believed to be more robust since it is independent of geometrical spreading, reflection and transmission loss, and illumination imbalance. Unfortunately, the conventional centroid frequency shift method is only applicable to pre-migration seismic data (i.e., time domain seismic data). He et al. (2012) propose an approach to obtain correct spectral information from post-migration depth domain seismic data and then input the spectral information to the centroid frequency shift method. However, their method is applicable only to common angle gathers of seismic data, where the takeoff angles at the selected CDPs are known.

SUMMARY OF THE INVENTION

The present invention involves a multi-domain approach, where the kernel matrix for Q tomography is constructed in depth domain based on common image gathers obtained by mapping time domain seismic data to image domain through migration, the depth domain seismic traces are then extracted and converted to time domain and frequency domain. The kernel matrix construction is based on a CDP-to-surface ray tracing procedure, where the takeoff angles for the ray tracing are found through a process including 1) deployment of virtual sources on the surface; 2) wavefront construction based ray tracing from the virtual sources to the subsurface and angle table building; and 3) an angle selection procedure to find the takeoff angles for selected CDPs for specific offsets. This multi-domain approach makes the centroid frequency shift method applicable to Q tomography using post-migration reflection seismic data. Furthermore, a frequency weighted exponential function may be used to approximate an asymmetric seismic frequency amplitude spectrum, and a box-constrained optimization algorithm may be employed to solve the Q tomography optimization problem to eliminate physically unrealistic solutions (Hu, 2011).

In one embodiment, the invention is a ray-based, centroid frequency shift Q tomography method for reconstructing subsurface profiles for 1/Q from common offset gathers of post-migration reflection seismic data, comprising: (a) a multi-domain approach for kernel matrix and measurement vector construction by using post-migration reflection seismic data, where the kernel matrix is built on the common offset gathers in the depth domain while the measurement vector is constructed by mapping the time domain reflection seismic traces to depth domain through Kirchhoff or other migration method; (b) then converting the extracted depth domain data to the time domain and the frequency domain, and approximating the seismic source's amplitude spectrum with a frequency weighted exponential function in order to calculate the asymmetric seismic data spectrum's centroid frequency shift due to earth attenuation, and relating said centroid frequency shift to attenuation as represented by the reciprocal of quality factor Q; and (c) solving for Q or 1/Q by iterative, linear optimization, wherein the optimization has box constraints to keep estimated Q values within position-dependent ranges specified by upper boundaries and lower boundaries. The constrained optimization may be solved by a multi-index active-set method.

The person skilled in the art of Q tomography will recognize that at least some of the steps of the present inventive method are preferably performed on a computer, programmed in accordance with the teachings herein, i.e., the invention is computer implemented in most practical applications.

BRIEF DESCRIPTION OF THE DRAWINGS

The present invention and its advantages will be better understood by referring to the following detailed description and the attached drawings in which:

FIGS. 1A, 1B, 11, and 14A-14B are black-and-white reproductions of colored original data displays, due to patent law restrictions.

Figure 1A:
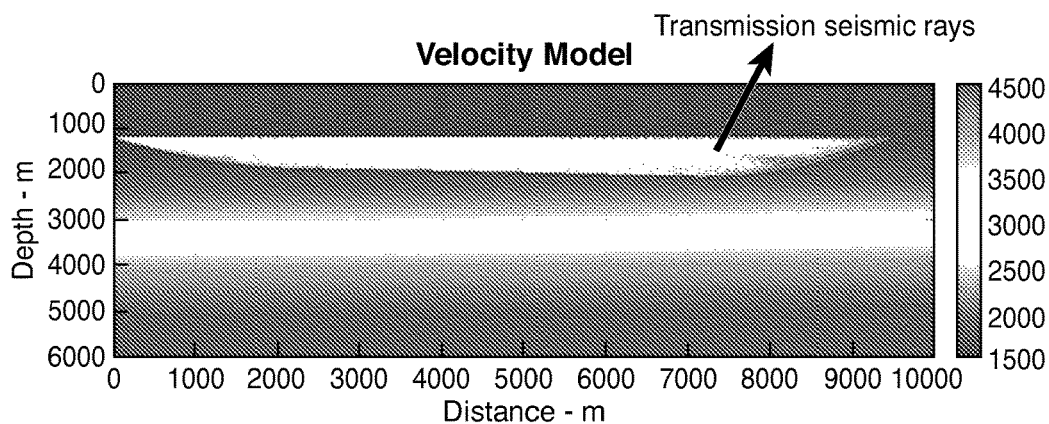
FIG. 1A shows a velocity model and transmission raypaths.
Figure 1B:
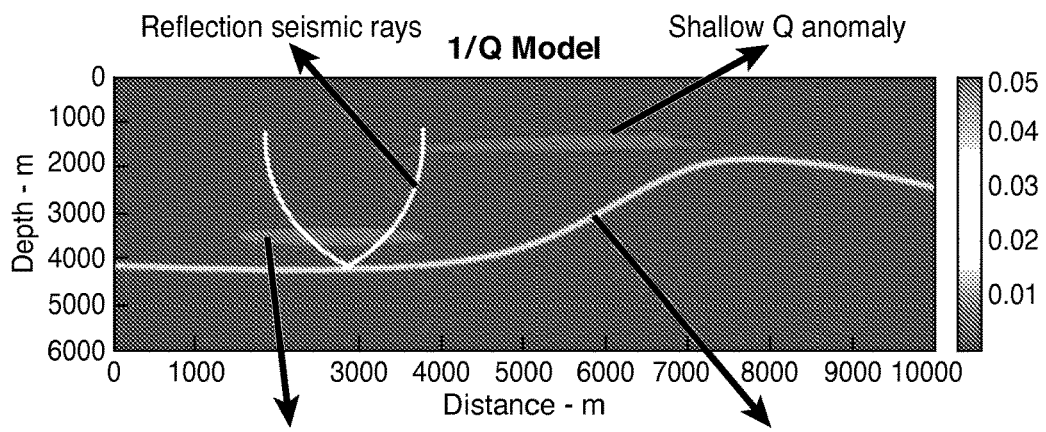
FIG. 1B shows a scenario where there is a shallow Q anomaly covered by the transmission seismic rays, and a deep Q anomaly which is not covered by the transmission seismic rays but is penetrated by reflection seismic rays.
Figure 2:
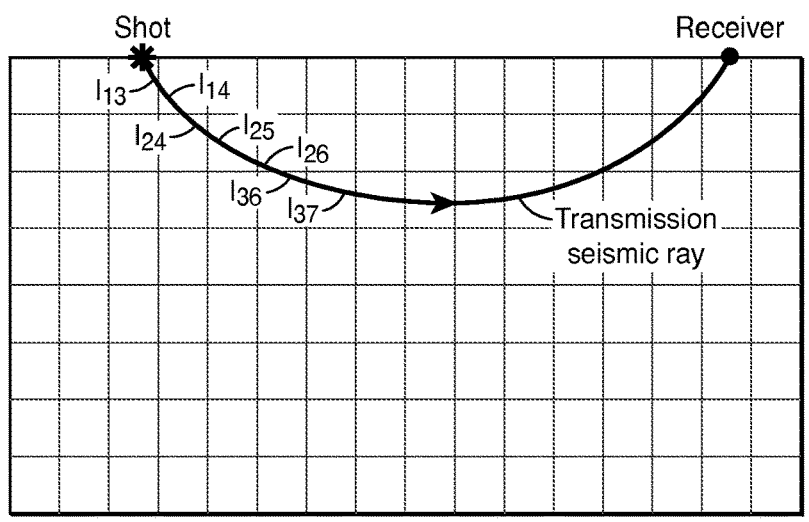
FIG. 2 shows a transmission seismic shot-to-receiver raypath in a gridded model.
Figure 3:
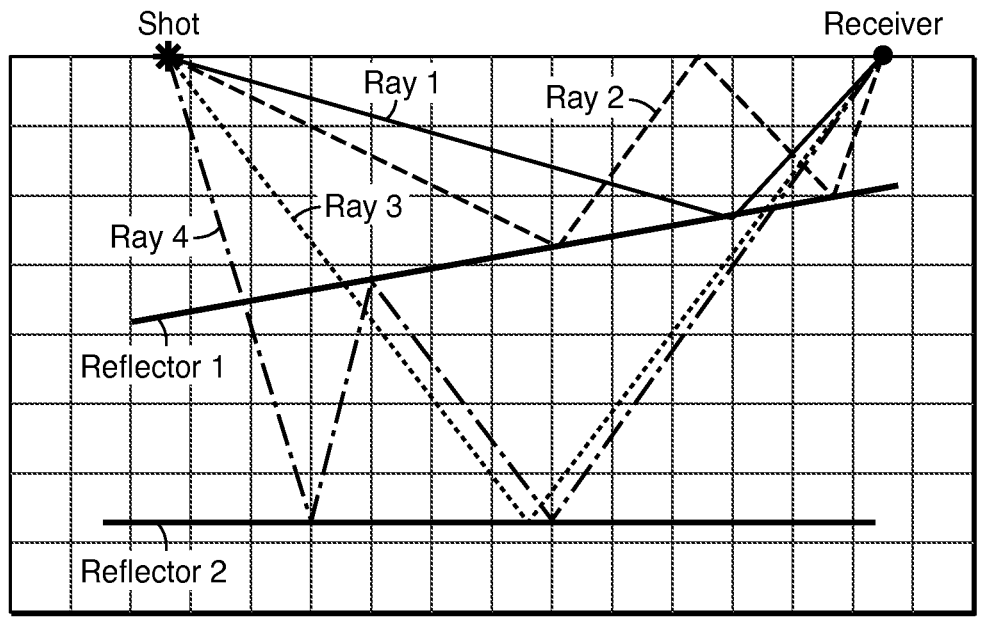
FIG. 3 shows multiple reflection seismic raypaths for a single shot-receiver pair.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present invention includes a method for reconstruction of 2D or 3D seismic quality factor (Q) profiles from reflection seismic data, a technical field known as reflection seismic data Q tomography.

The main features of the present invention in at least some embodiments are as follows. The reflection seismic data are migrated by any migration method including, but not limited to Kirchhoff migration to obtain a common image gather (CIG), which can be a common angle gather or a common offset gather. At least one common depth point (CDP) is selected in the CIG. In other words, the same point is located in each image of the CIG. If the migration velocity model happens to be perfect, then this selected CDP will be located at the same (x,y,z) coordinates in each image; otherwise not. With estimated dip information, two seismic rays are shot from each selected CDP to the surface using ray tracing according to Snell's Law. For a common angle gather, the takeoff angles for this CDP-to-surface ray tracing are known. For common offset gathers, the takeoff angles for the CDP-to-surface ray tracing may be found through deploying virtual sources on the surface, performing wavefront-construction-based ray tracing from the virtual sources to the subsurface and saving the incident angles at the CDPs and building the angle table, and implementing an angle selection procedure to find the matched takeoff angles for the selected CDPs for the specific offsets. The raypath information of the CDP-to-surface ray tracing is collected for all the rays shot from the selected CDPs to construct the kernel matrix. For each selected CDP, the associated vertical depth domain seismic trace in the CIG is extracted. The extracted vertical traces are converted to the time domain and then to the frequency domain through depth-to-time conversion, a wavelet stretching correction, and fast Fourier transform (FFT). The source wavelet amplitude spectrum is analyzed and fitted by a frequency weighted exponential function and the centroid frequency of the source wavelet is calculated. The centroid frequency shifts (with respect to the source wavelet centroid frequency) of the extracted traces are calculated to construct the measurement vector. The kernel matrix and the measurement vector are input to an optimization algorithm with box constraints to reconstruct the Q profile, where the ranges of the Q values are predetermined by a priori information. This constrained optimization is solved by employing the multi-index active-set method (Morigi et al., 2007).

Some underlying theory of the invention is explained next.

Figure 4:
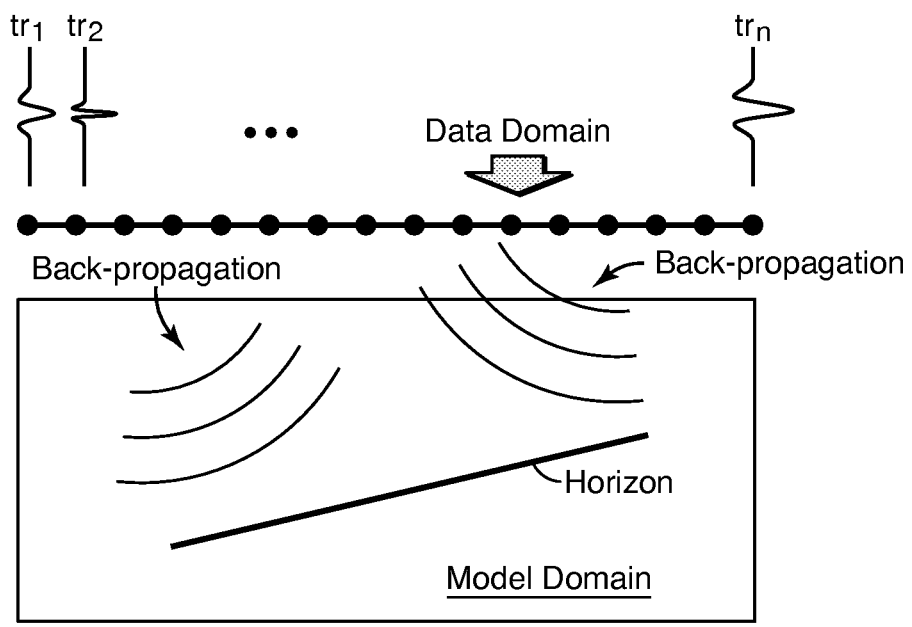
FIG. 4 shows a diagram illustrating the migration process of converting time domain reflection seismic data to depth domain seismic data.
Figure 5:
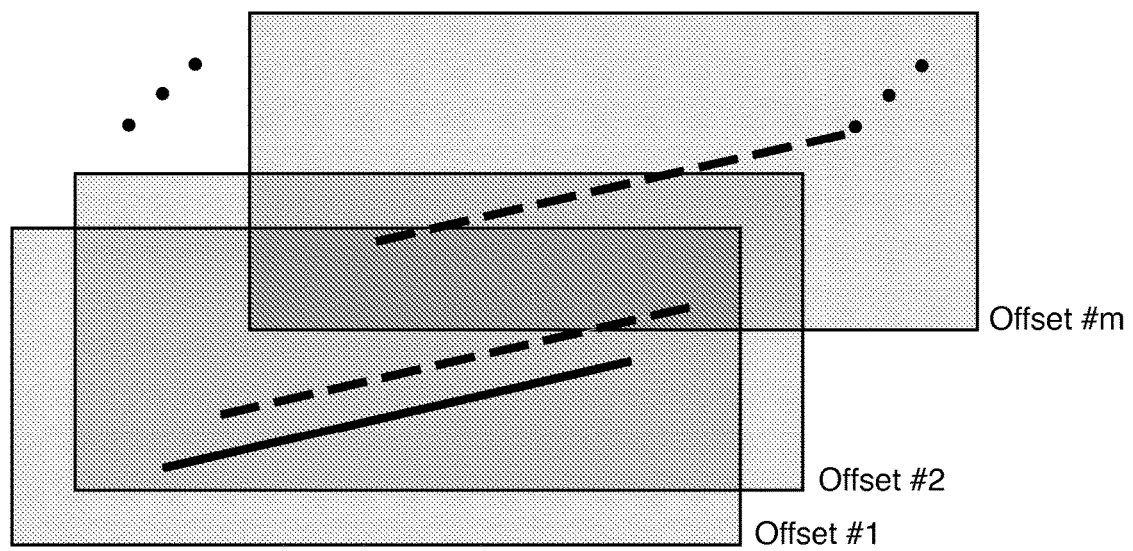
FIG. 5 schematically illustrates a common offset gather obtained via migration of reflection seismic data.
Figure 6:
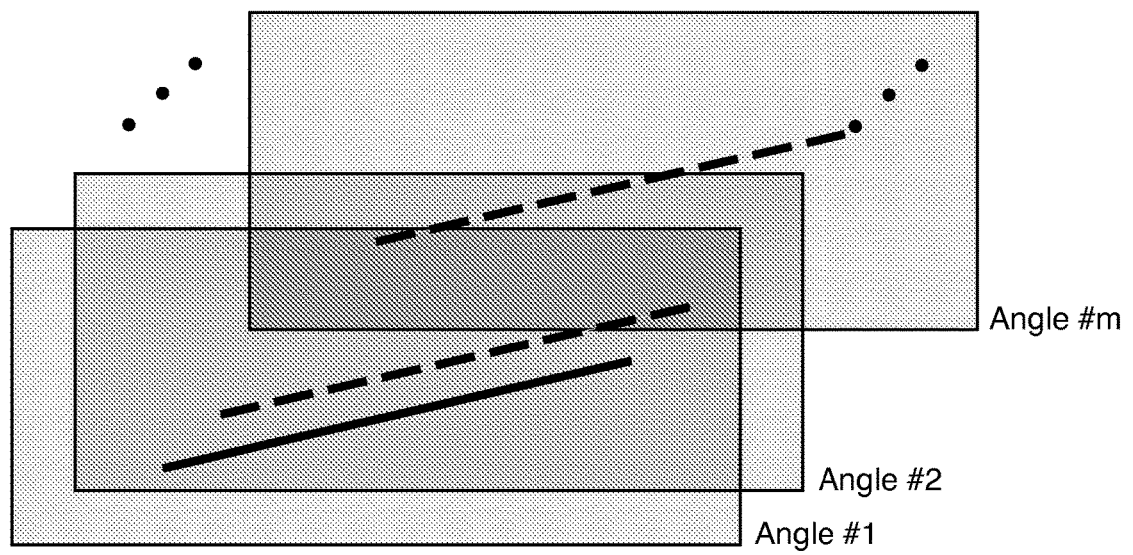
FIG. 6 schematically illustrates a common angle gather via migration of reflection seismic data.

First, with the assumption that an accurate velocity model has been provided, the time domain reflection seismic data are migrated to obtain the common image gather (either common offset gather or common angle gather), which are the post-migration pre-stack reflection seismic data. By doing this, the time domain seismic data are converted to the depth domain. FIG. 4 is the diagram to show the migration process. In FIG. 4, the data domain consists all the shots and receivers represented by the dots on the surface and the model domain are the subsurface rectangular area. The seismic traces are back-propagated downward to the model domain to obtain the depth domain seismic data. For example, the horizon shown in FIG. 4 is the actually the seismic energy in the depth domain mapped from the time domain reflection seismic data. Separating the contributions from different offsets or from different angles, a common offset gather or common angle gather, which is a series of images as shown in FIG. 5 and FIG. 6, can be obtained.

Figure 7:
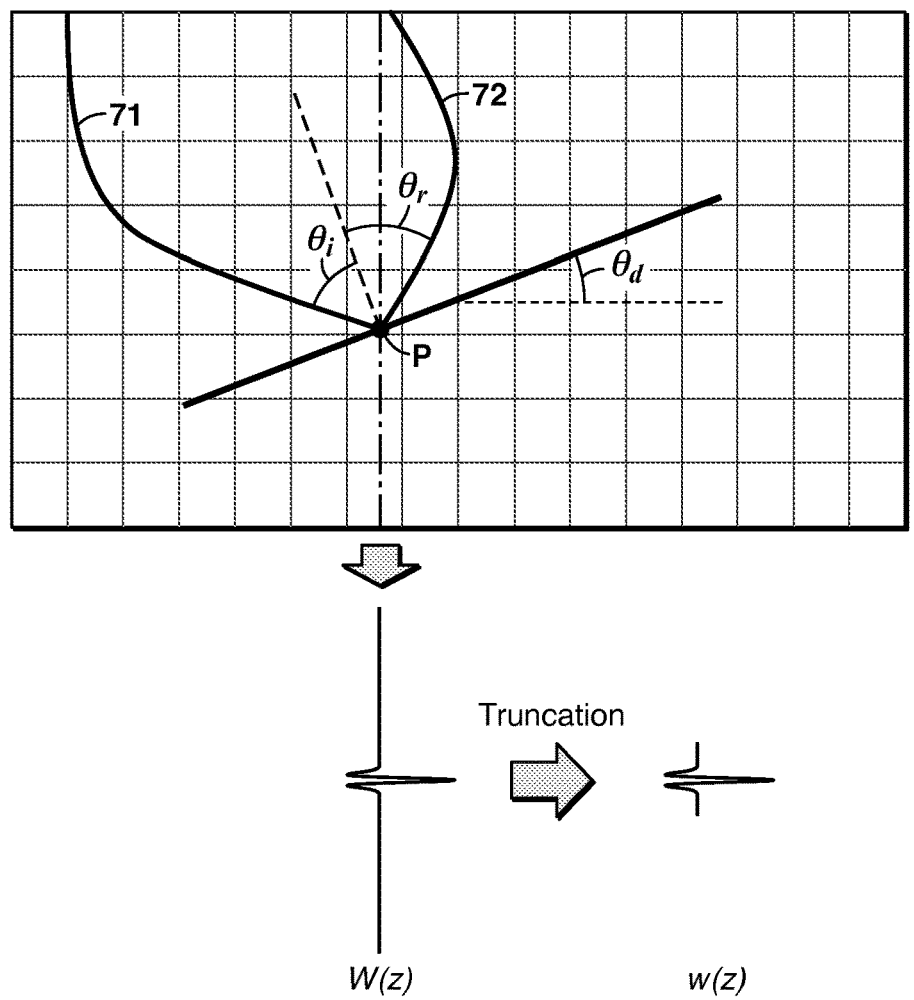
FIG. 7 shows the ray tracing from a selected CDP point P on a selected horizon in an image from the common image gather.

In each image in the common image gather (common offset gather or common angle gather), at least one horizon is selected and on this selected horizon, at least one CDP point is selected, as shown in FIG. 7 (point P). In FIG. 7, the dashed line is the normal direction to the horizon; the dot-dashed line and the dotted line are the vertical and horizontal directions, respectively. Then, for common angle gathers, from this selected CDP point P, because the takeoff angle $\theta_i$ is known, with the dip angle $\theta_d$ estimated by a dip estimation tool (Marfurt, 2006), two rays 71 and 72 are shot to the surface. After that, the ray length in each grid is measured. Let $l_j^{lk}$ be the ray length in the $j^{th}$ grid cell for the $k^{th}$ selected point in $l^{th}$ image in the CIG, the elements in the kernel matrix A can be determined by (Hu, 2011)

$$A_{ij} = \frac{\pi l_j^{kl}}{v_j}, \tag{1}$$

where i is the row index of the kernel matrix corresponding to k and l (each combination of k and l corresponds to a distinct row index i of the kernel matrix, where the relationship between i, k and l depends on the number of images in the common image gather), and j is the column index of the kernel matrix, and $v_j$ is the seismic velocity in the $j^{th}$ grid. (In this document, the term grid, which might alternatively be called cell, means a single element in the gridded velocity model.) The whole kernel matrix can be constructed by repeating this procedure for all the selected images, horizons, and CDP points.

Figure 15:
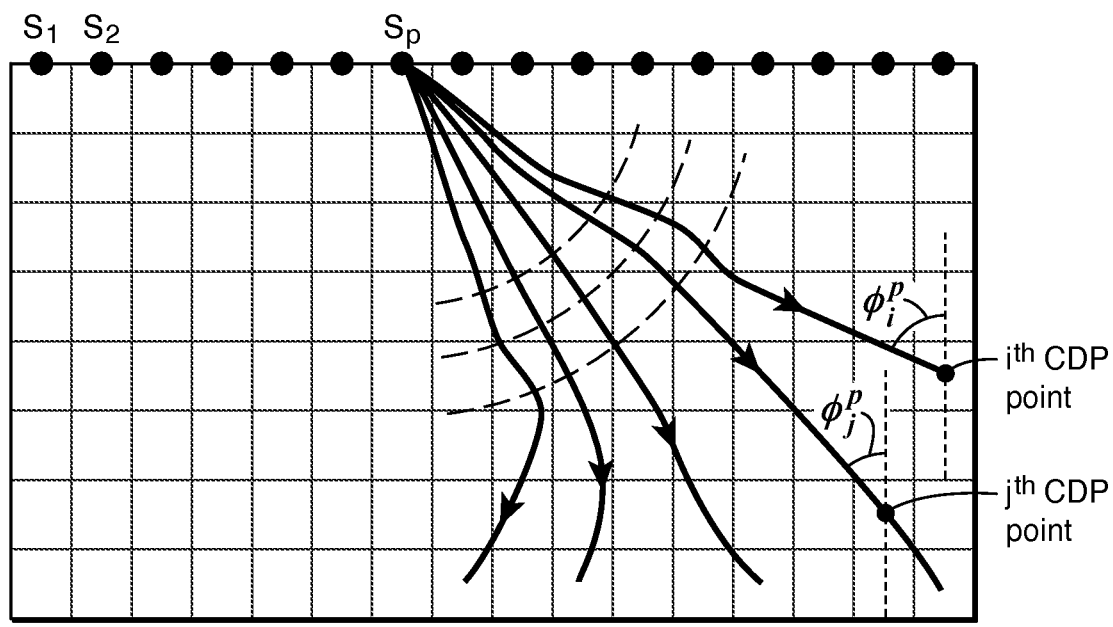
FIG. 15 shows wavefront-construction-based ray tracing from a virtual source to the subsurface.

Unfortunately, common angle gathers are not always available. In many applications, one may have only common offset gathers as shown in FIG. 5. Therefore, to shoot two rays from the selected CDP point to the surface, it is first necessary to find the corresponding takeoff angle at the selected CDP point. A procedure for finding the takeoff angle is as follows:

(1) Deploy a series of virtual sources $(S_1, S_2, \ldots, S_P, \ldots)$ on the surface at each grid as shown in FIG. 15.

(2) From each virtual source, perform wavefront construction based ray tracing (see, for example, Vinje et al., 1993); then, at each CDP point i, save the incident angle $\phi_i^p$, which is the angle between the ray direction and the vertical direction, to build a lookup angle table, where p is the index of the associated virtual source.

Figure 16:
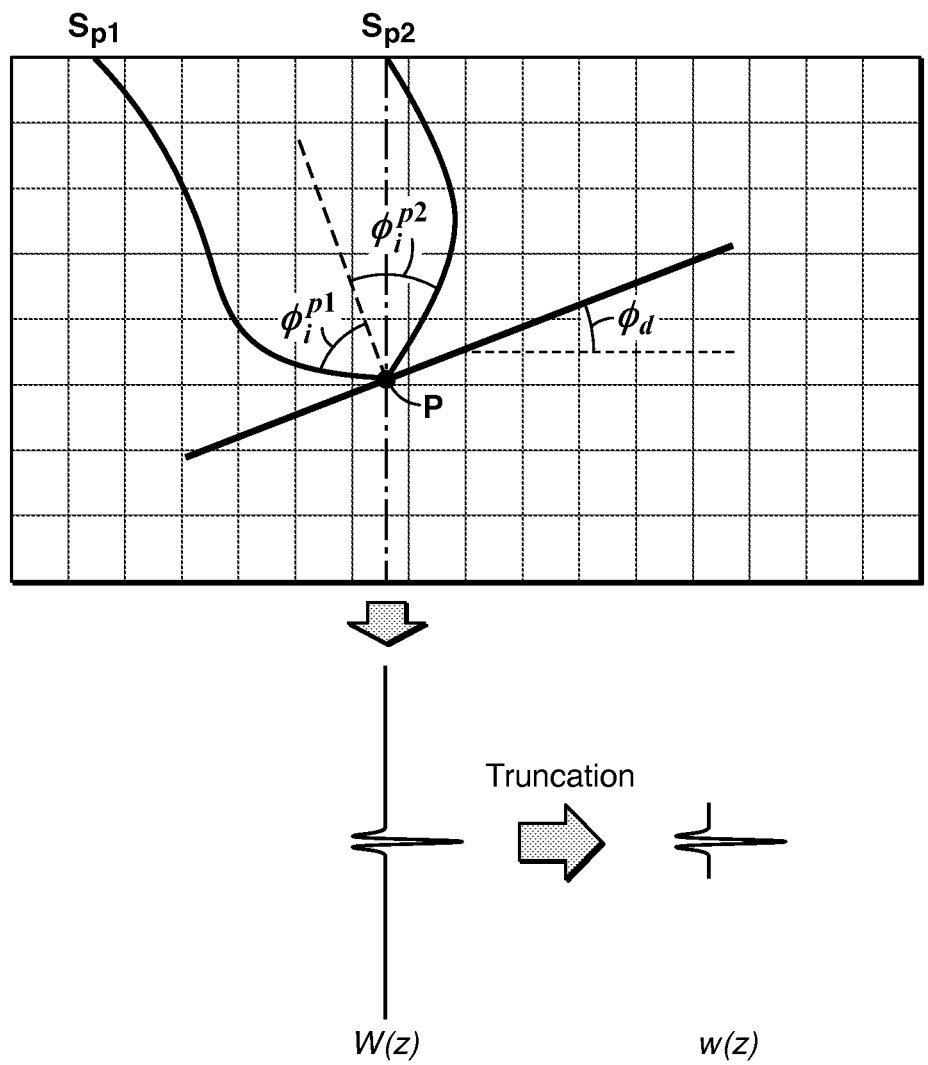
FIG. 16 shows ray tracing from a selected CDP point P on a selected horizon in an image from the common offset gather.

(3) At each selected CDP point in an image extracted from the common offset gather with offset $d_{off}$, find two angles $\phi_i^{p1}$ and $\phi_i^{p2}$ satisfying $\theta_i = \theta_r = (\phi_i^{p2} - \theta_d)$ and $d_{off} = |x_{p1} - x_{p2}|$, where $\theta_d$ is the dip angle at the selected CDP point, p1 and p2 are the indices of the virtual sources $S_{p1}$ and $S_{p2}$ as shown in FIG. 16, whose positions are represented by $x_{i1}$ and $x_{i2}$.

(4) With the takeoff angle $\phi_i^{p1}$ or $\phi_i^{p2}$ and the dip angle $\theta_d$, two rays are shot from this selected CDP point to the surface, as shown in FIG. 16.

After that, similar to the procedure implemented in the common angle gather cases, a kernel matrix can be constructed by using equation (1). All variations and equivalent or similar approaches to the above 4-step method are within the scope of the present invention.

A key part of the present invention is the construction of the measurement vector, which is explained as follows.

Figure 8:
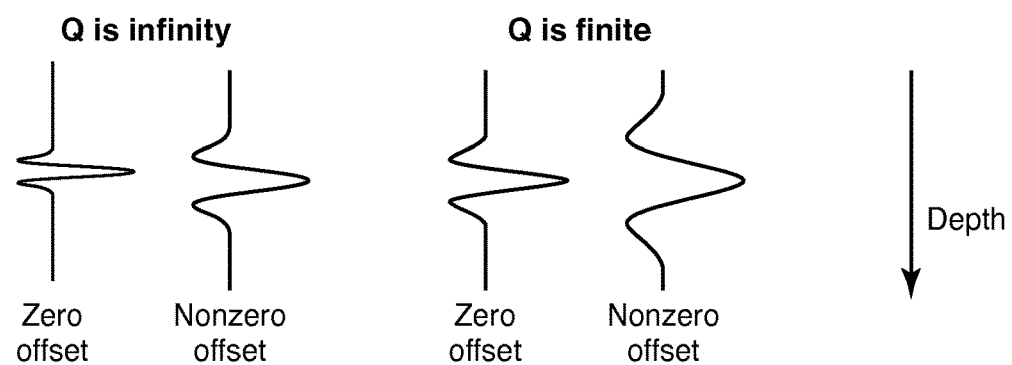
FIG. 8 shows the depth domain seismic traces extracted from the common image gather.
Figure 9:
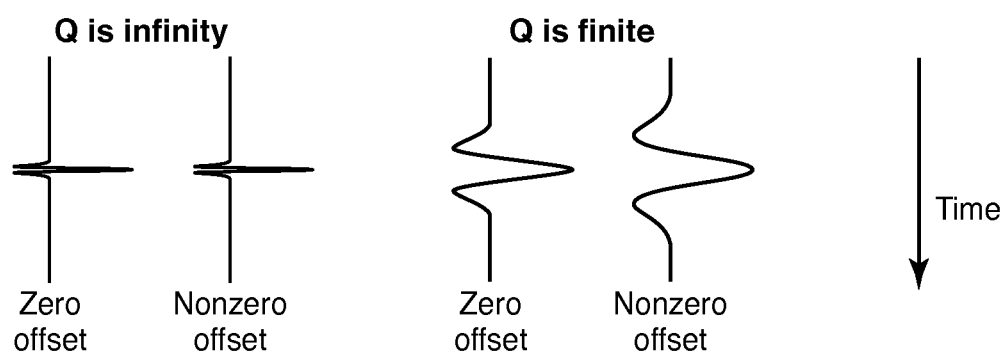
FIG. 9 shows the time domain seismic traces obtained through depth-to-time conversion and the wavelet stretching correction.

In a specific image from a CIG, as shown in FIG. 7 or FIG. 16, a vertical post-migration reflection seismic trace W(z) is extracted at the selected CDP P and this depth domain trace is then truncated to contain only the wavelet w(z) around the position P. These extracted wavelets w(z) are shown in FIG. 8. In FIG. 8, it is observed that the widths of the wavelets are offset-dependent, which is a well-known wavelet stretching phenomenon. This wavelet stretching issue needs to be addressed in order to extract the correct frequency content information to be used in Q tomography. Another phenomenon observed is that, when Q anomalies (within which Q values are finite) are present, the wavelet widths are larger as long as the traces penetrate one of these Q anomalies. This phenomenon is expected because Q anomaly attenuates high frequency more significantly, which leads to a downshift of the frequency content. This frequency shift information will eventually be used to estimate the Q values in the Q tomography algorithm. However, these extracted and then truncated seismic traces shown in FIG. 8 are not ready for frequency content analysis because they are still in depth domain. Therefore, the extracted depth domain seismic traces w(z) need to be converted to time domain and the wavelet stretching correction needs to be applied (a single step). This procedure is implemented by using the following formulation for conversion between time and depth:

$$\Delta t(z) = \frac{\Delta z(z)}{v(z)} [\cos(\theta_i + \theta_d) + \cos(\theta_i - \theta_d)], \quad (2)$$

where v(z) is the vertical velocity profile at CDP P, $\theta_i$ is the incident angle and $\theta_d$ is the dip angle as shown in FIG. 7. The depth domain seismic trace w(z) can be converted to time domain signal w(t) shown in FIG. 9 by using formulation (2). In FIG. 9, it may be observed that, after the wavelet stretching correction is applied, the width of the time domain wavelet is independent of offset if the Q value is infinity, which corresponds to zero attenuation. However, if Q values are finite, the wavelet width is still dependent on the offset because the Q profile along the ray path determines the frequency content modification of the trace.

The time domain seismic traces in FIG. 9 are now ready for frequency content analysis. First, the traces w(t) are converted to frequency amplitude spectrum w(t) by using the Fourier transform, preferably the fast Fourier transform (FFT). After that, the centroid frequency of the signal $f_c^w$ and the centroid frequency of the source $f_c^s$ are calculated respectively using $$f_c^w = \frac{\int_0^{+\infty} f w(f) df}{\int_0^{+\infty} w(f) df} \text{ and} \quad (3)$$

$$f_c^s = \frac{\int_0^{+\infty} f s(f) df}{\int_0^{+\infty} s(f) df}, \quad (4)$$

where s(f) is the frequency amplitude spectrum of the source wavelet. The centroid frequency shift is $$\Delta f_c = f_c^s - f_c^w. \quad (5)$$

Assuming that the source frequency amplitude spectrum can be approximated by a frequency weighted exponential function (see Hu 2011, which is incorporated herein by reference)

$$s(f) = A f^n \exp\left(-\frac{f}{f_0}\right), \quad (6)$$

where A, n, $f_0$ are real numbers, one is able to find the values of A, n, $f_0$ by fitting the frequency weighted exponential function (6) to the source frequency amplitude spectrum. (The constant A is unrelated to the kernel matrix A.) The measurement vector for centroid frequency shift based reflection seismic Q tomography can now be constructed as $$b = \frac{\Delta f_c}{f_0 f_c^w}. \quad (7)$$

With equations (1) and (7), the reflection seismic data Q tomography can be posed as an optimization problem with box constraints (See Eqn. (14) in Hu 2011)

$$\min \|Ax - b\| \text{ subject to } l < x < u, \quad (8)$$

where l and u are the vectors storing the lower boundaries and the upper boundaries of the 1/Q values, and x is a vector of the unknowns, i.e., $$x_j = 1/Q_j.$$

A preferred type of algorithm that may be employed to solve the optimization problem of Eqn. (8) is a multi-index active-set method such as was disclosed by Morigi et al. (2007).

Figure 10:
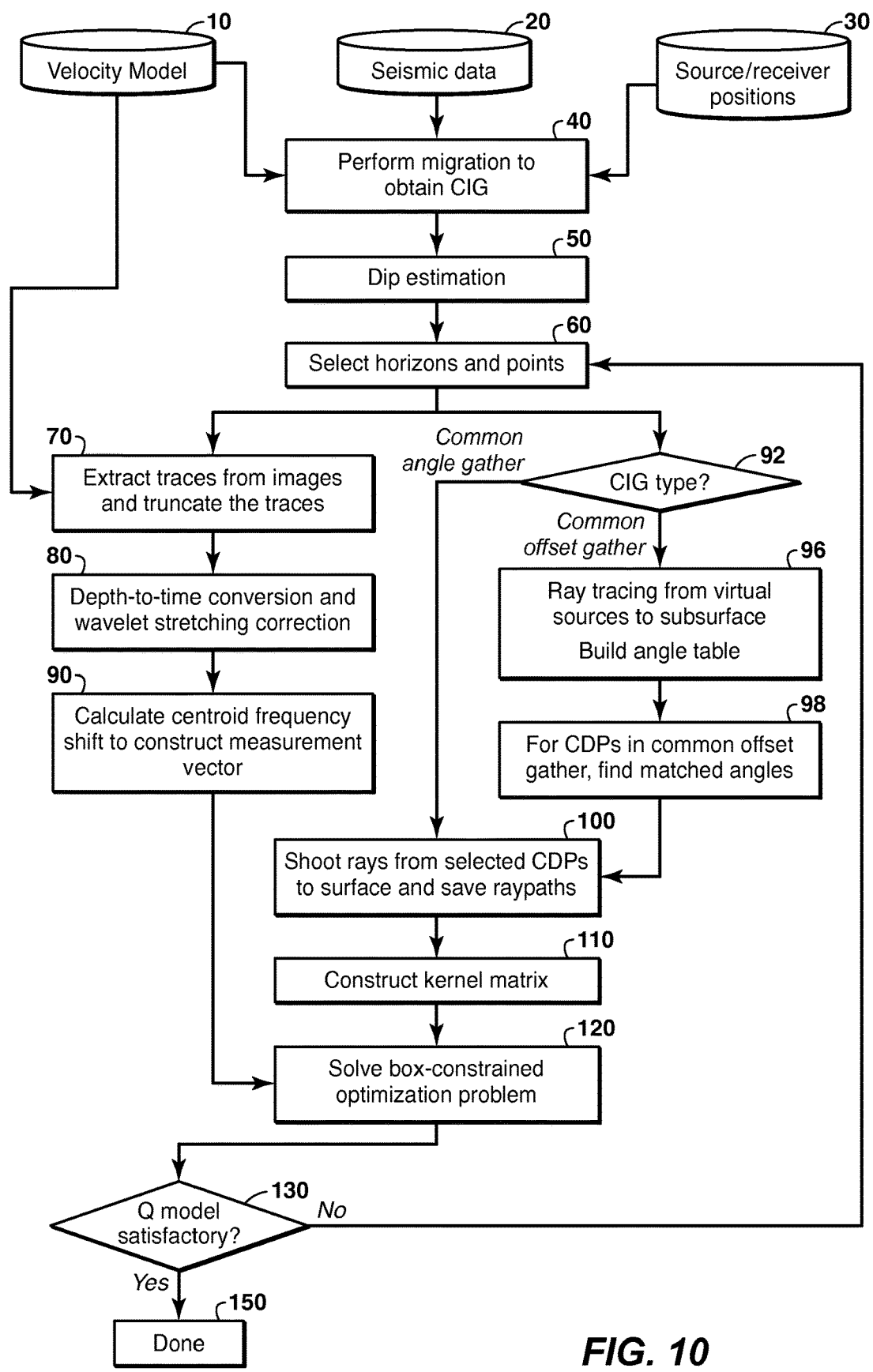
FIG. 10 is a flow chart showing basic steps in one embodiment of the present inventive method.

In one of its embodiments, the present invention can be implemented according to the flow chart shown in FIG. 10. In step 40, the velocity model 10, the seismic data 20, and the source/receiver positions 30 are input into the migration code to obtain the common image gather. In step 50, the poststack migration result is input into a dip estimation algorithm to estimate the dip angles ($\theta_d$ in Eqn. (2)). In step 60, at least one horizon is selected and at least one point on this horizon is selected. If the obtained common image gather is a common offset gather (92), then in step 96 virtual sources are deployed on the surface and the wavefront construction based ray tracing is performed from the virtual sources to the subsurface; the ray incident angle for each CDP for each virtual source is saved and used to build an angle table. After that, in step 98, for each selected CDP in each image from the common offset gather, the associated takeoff angle is found in the angle table. Then, in step 100, two rays are shot from each of these selected points to the surface by using a ray tracing algorithm. As explained earlier, these are not arbitrary rays. If at step 92 the CIG is a common angle gather as shown in FIG. 5, then the takeoff angle for the ray tracing from the selected CDP point is known; if the CIG is a common offset gather, for each selected CDP point and the specific offset, the takeoff angle already has been found in step 98. With this takeoff angle and the estimated dip angle, two rays are traced from the CDP point according to Snell's law.

The raypath information obtained in step 100 is input to step 110 to construct the kernel matrix for Q tomography. In step 70, the vertical seismic trace is extracted from the images obtained in step 40 for each CDP selected in step 60 and these extracted traces are truncated to contain only the events associated with the selected CDPs. A vertical seismic trace here means the extracted vertical slice from the migration image as shown in FIG. 7 and FIG. 16. Because it is extracted from an image, this trace is in depth domain.

In step 80, the depth-to-time conversion and the wavelet stretching correction are applied on the extracted depth domain seismic traces obtained in step 70. In step 90, the centroid frequency shifts of the extracted traces with respect to the source wavelet centroid frequency are calculated to construct the measurement vector. The measurement vector and the kernel matrix are input into step 120 to formulate the box-constrained tomographic optimization problem and this optimization problem is solved iteratively for 1/Q. If the reconstructed Q model is accepted after the judgment in step 130, the Q tomography process finishes. Otherwise, the user may reselect the horizons and the points on the horizons and repeat steps 70 to 120 until the reconstructed Q model is satisfactory.

EXAMPLES

Figure 11:
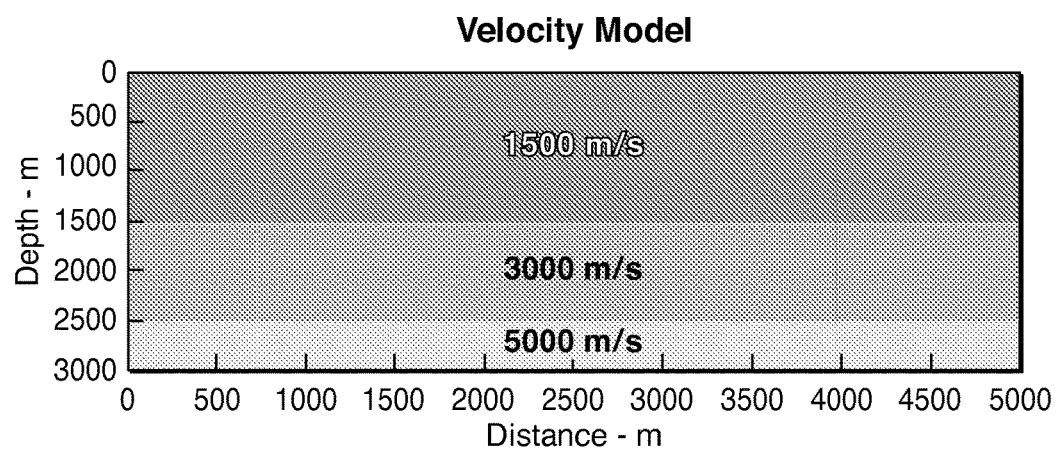
FIG. 11 shows the layered velocity model used for the example.
Figure 14A:
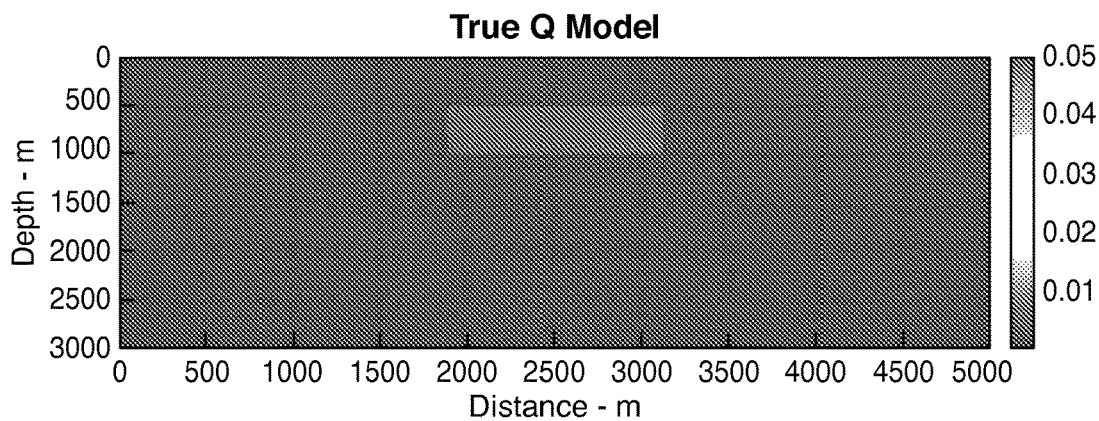
FIG. 14A shows the true Q model for the example.

In this section, a synthetic example of reflection seismic data Q tomography is presented. FIG. 11 shows the velocity model, which is a layered model. The first layer (from the surface to the depth of 1500 m) has a constant velocity of 1500 m/s. The second layer (from the depth of 1500 m to the depth of 2500 m) has a constant velocity of 3000 m/s. The third layer (from the depth of 2500 m to the depth of 3000 m) has a constant velocity of 5000 m. In the first layer, there is an embedded Q anomaly with a constant Q value of 20, as shown in FIG. 14A. Although this Q anomaly is located in a shallow region, the refraction seismic data still cannot be used. The reason is that, in this case, the refractive seismic rays only exist at the surface (i.e., z=0) because the seismic velocity in this example is a constant in the first layer. For a constant seismic velocity model, the refractive rays travel only on the surface.

Figure 12:
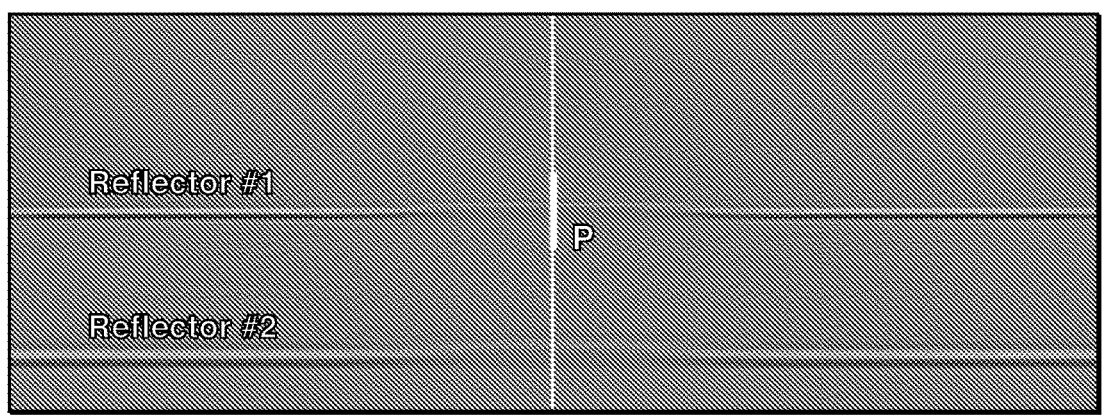
FIG. 12 shows the post-migration seismic data for a specific offset.
Figure 13:
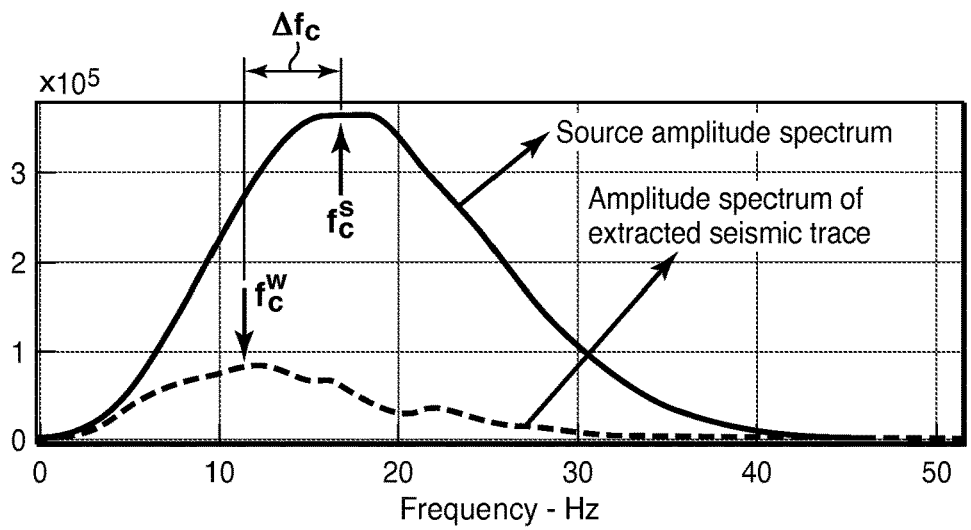
FIG. 13 shows the amplitude spectra of the source, the extracted post-migration reflection seismic data, and the centroid frequency shift due to the Q anomaly.

FIG. 12 shows the migrated reflection seismic data for a specific offset. At a selected CDP point P, a vertical post-migration seismic trace is extracted and then only a short segment of the trace (highlighted line in FIG. 12) is kept to contain only the event associated with CDP P. This segment of the trace (depth domain) is converted to the time domain and the wavelet stretching correction is applied for nonzero offset. After that, the time domain trace is converted to frequency domain. The frequency amplitude spectrum is plotted in FIG. 13. As shown in FIG. 13, in comparison with the source amplitude spectrum, as expected, the frequency content of the post-migration seismic data is different from the source frequency content. The amount of the centroid frequency downshift can be measured as $\Delta f_c$ shown FIG. 13. This procedure is repeated until all the $\Delta f_c$ are measured to build the measurement vector using formulation (7).

Figure 14B:
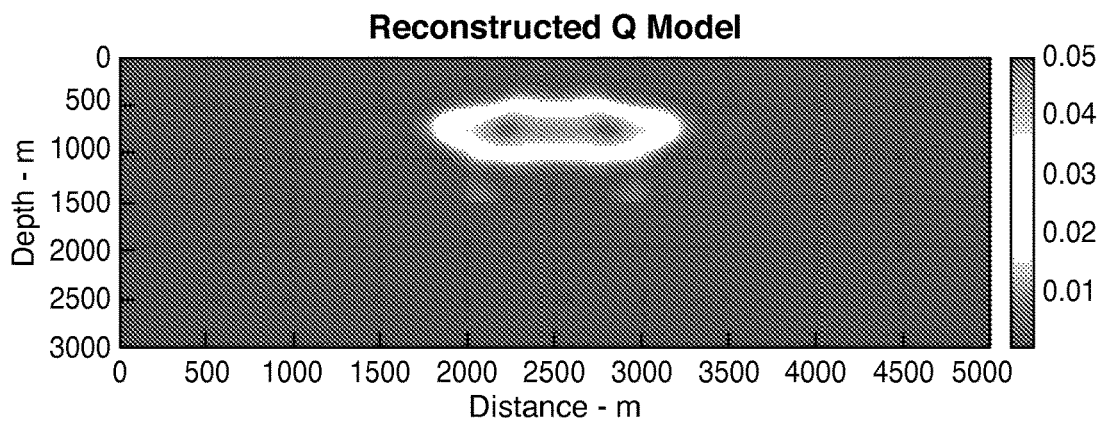
FIG. 14B shows the reconstructed Q model using the present inventive method.

Ray tracing (the procedure shown in FIGS. 7 and 16) is implemented for each selected CDP to build the kernel matrix A. Eventually, the tomographic inversion problem (8) is solved and the Q anomaly is reconstructed as shown in FIG. 14B, which is close to the true Q model.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

REFERENCES

He, Yang and Jun Cai, "Q tomography towards true amplitude image and improve sub-karst image," SEG Annual Meeting, Las Vegas (2012).

Hu, W., J. Liu, L. Bear, and C. Marcinkovich, "A robust and accurate seismic attenuation tomography algorithm," *SEG Expanded Abstracts* 30, 2727 (2011).

Hu, W., "Q Tomography Method," PCT Patent Application Publication WO2011/139419 (2011).

Hung B., K. F. Xin, S. Birdus, and J. Sun, "3-D tomographic amplitude inversion for compensating transmission losses in the overburden," 70th Meeting, EAGE, H004 (2008).

Liao, Q. and G. A. McMechan, "Multifrequency viscoacoustic modeling and inversion," *Geophysics* 61, 1371-1378 (1996).

Marfurt, K. J., "Robust estimates of 3D reflector dip and azimuth," *Geophysics* 71, P29-P40 (2006).

Morigi, S., L. Reichel, F. Sgallari, and F. Zama, "An iterative method for linear discrete ill-posed problems with box constraints," *Journal of Computational and Applied Mathematics* 198, 505-520 (2007).

Pratt, R. G., K. Bauer, and M. Weber, "Crosshole waveform tomography velocity and attenuation images of arctic gas hydrates," 73rd SEG, Expanded Abstracts, 2255-2258, Society of Exploration Geophysics (2003).

Quan, Y. and J. M. Harris, "Seismic attenuation tomography using the frequency shift method," *Geophysics* 62, 895-905 (1997).

Rossi, G., D. Gei, G. Bohm, G. Madrussani, and J. M. Carcione, "Attenuation tomography: An application to gas-hydrate and free-gas detection," *Geophysical Prospecting* 55, 655-669 (2007).

Vinje, V., E. Iversen, and H. Gjoystdal, "Traveltime and amplitude estimation using wavefront construction," *Geophysics* 58, 1157-1166 (1993).

The invention claimed is:

1. A ray-based Q-tomography method of generating a subsurface model for prospecting for hydrocarbons using recorded reflection seismic data from a subsurface region, comprising:

migrating the seismic data to depth domain to obtain common image gathers, said common image gathers being common offset gathers, where a kernel matrix is constructed using raypath information obtained through a ray tracing procedure, and selected seismic traces from a common image gather are converted to time domain, then a centroid frequency shift relative to a seismic source wavelet centroid frequency is determined, then an expression relating the centroid frequency shift and the kernel matrix to seismic attenuation, as measured by a frequency independent quality factor Q, is iteratively solved for Q, a representation of seismic attenuation, using a computer, generating a subsurface model that identifies an anomaly in the subsurface corresponding to the Q; and using the subsurface model to prospect for hydrocarbons;

wherein the kernel matrix construction includes, (a) in each image corresponding to a common offset, selecting at least one horizon, and on the horizon at least one common depth point, (b) tracing two rays from each selected common depth point to the surface, and (c) measuring ray lengths in each penetrated subsurface grid, each subsurface grid corresponding to a column index of the kernel matrix, and using a subsurface velocity model to form elements of the kernel matrix;

wherein the selected seismic traces comprise a vertical trace for each selected common depth point, extracted from the common image gather;

wherein the conversion to time domain of the selected seismic traces is performed while applying a wavelet stretching correction and is expressed by $$\Delta t(z) = \frac{\Delta z(z)}{v(z)}[\cos(\theta_i + \theta_d) + \cos(\theta_i - \theta_d)]$$

where $\Delta t$ is a time duration corresponding to $\Delta z$, which is proportional to vertical mesh size in a computational grid, as a function of depth z; v(z) is vertical seismic velocity profile as a function of the depth z; $\theta_i$ is seismic ray incident angle at the selected common depth point; and $\theta_d$ is dip angle of the selected horizon at the selected common depth point; and
wherein the centroid frequency shift is determined for each selected trace after transforming the selected trace to frequency domain.

2. The method of claim 1, wherein (b) comprises:
(i) estimating a dip angle of the selected horizon where the selected common depth point is located;
(ii) finding two takeoff directions making equal angles with the normal direction to the horizon at the selected common depth point such that two rays traced using Snell's Law from the selected common depth point at the two takeoff directions reach surface locations that are separated by the common offset;
(iii) tracing the two rays defined in (ii).

3. The method of claim 1, wherein (ii) comprises:
deploying a plurality of virtual sources on the surface;
performing wavefront construction based ray tracing from the virtual sources to the selected common depth point and building a table giving ray incident angle at the selected common depth point for each virtual source location; and
selecting from the table two incident angles for the selected common depth point that match the common offset, and using these two selected incident angles as the takeoff directions.

4. The method of claim 1, wherein the determination of the centroid frequency shift comprises analyzing the source wavelet frequency distribution and fitting an asymmetric frequency distribution with a frequency weighted exponential function of frequency, and further comprising computing a component of a measurement vector from the centroid frequency shift and using the measurement vector to represent the centroid frequency shift in the expression that is solved by iterative optimization.

5. The method of claim 4, wherein the frequency-weighted exponential function of frequency can be expressed in the form $$F(f) = A f^n \exp\left(-\frac{f}{f_0}\right)$$

where f is frequency, A is a constant for amplitude scaling, $f_0$ is a characteristic frequency, and n is a symmetry index.

6. The method of claim 1, wherein the extracted vertical traces are truncated to include only the events associated with the selected horizon.

7. The method of claim 1, wherein the iterative solving for Q comprises a linear optimization using box constraints to keep estimated Q values within position-dependent ranges specified by upper boundaries and lower boundaries.

8. The method of claim 1, wherein the iterative solving for Q comprises a constrained optimization that is solved by a multi-index active-set method that allows updates of the active set by multiple computational grid indices at a time, wherein a grid index denotes subsurface location.

* * * * *